United States Patent [19]

Hansen et al.

[11] Patent Number: 5,705,796
[45] Date of Patent: Jan. 6, 1998

[54] REINFORCED COMPOSITES FORMED USING INDUCTION THERMOPLASTIC WELDING

[75] Inventors: Karl A. Hansen, deceased, late of Seattle, by John deJong, executor; C. David Lunden, Federal Way, both of Wash.

[73] Assignee: The Boeing Company, Seattle, Wash.

[21] Appl. No.: 608,454

[22] Filed: Feb. 28, 1996

Related U.S. Application Data

[63] Continuation of Ser. No. 286,360, Aug. 5, 1994, Pat. No. 5,500,511, which is a continuation-in-part of Ser. No. 68,520, May 27, 1993, abandoned, which is a continuation-in-part of Ser. No. 777,889, Oct. 18, 1991, abandoned.

[51] Int. Cl.$^6$ ...................................................... H05B 6/10
[52] U.S. Cl. .......................... 219/633; 219/645; 16/272.2; 16/274.4
[58] Field of Search ............................ 219/615, 618, 219/633, 634, 645, 656, 670, 765; 156/272.4, 380.2; 428/220

[56] References Cited

U.S. PATENT DOCUMENTS

| | | |
|---|---|---|
| 2,241,312 | 5/1941 | Luty . |
| 2,273,423 | 2/1942 | Somes . |
| 2,372,920 | 4/1945 | Blessing . |
| 2,378,801 | 6/1945 | Sidell et al. . |
| 2,379,829 | 3/1945 | Pedlow et al. . |
| 2,423,922 | 7/1947 | Arndt, Jr. . |
| 2,589,777 | 3/1952 | Collins . |
| 2,761,941 | 9/1956 | Ardichvili . |
| 2,898,435 | 8/1959 | Crafts . |
| 3,101,403 | 8/1963 | Lewis et al. . |
| 3,183,460 | 5/1965 | Bennon . |
| 3,288,979 | 11/1966 | Mills et al. . |
| 3,395,261 | 7/1968 | Leatherman et al. . |
| 3,431,379 | 3/1969 | Yrene . |
| 3,450,856 | 6/1969 | Buck et al. . |
| 3,492,453 | 1/1970 | Hurst . |
| 3,507,735 | 4/1970 | Chisholm . |
| 3,574,031 | 4/1971 | Heller, Jr. et al. . |
| 3,845,268 | 10/1974 | Sindt . |
| 3,864,186 | 2/1975 | Balla . |
| 3,941,643 | 3/1976 | Balla . |
| 3,946,349 | 3/1976 | Haldeman, III . |
| 3,996,402 | 12/1976 | Sindt . |
| 4,005,302 | 1/1977 | Graf et al. . |
| 4,029,837 | 6/1977 | Leatherman . |
| 4,029,926 | 6/1977 | Austin . |
| 4,067,765 | 1/1978 | Heller, Jr. et al. . |
| 4,091,254 | 5/1978 | Struve . |
| 4,120,712 | 10/1978 | Sindt . |

(List continued on next page.)

FOREIGN PATENT DOCUMENTS

| | | |
|---|---|---|
| 0 461 979 | 4/1994 | European Pat. Off. . |
| 54-25542 | 2/1979 | Japan . |

OTHER PUBLICATIONS

J. Giachino, Welding Skills and Practices, Am. Tech. Soc., Chicago, IL (1960,1965,1967,1971,1976) 393–401.

Border et al., *Induction Heated Joining of Thermoplastic Composites without Metal Susceptors*, 34th Int'l SAMPE Symp. May 8–11, 1989, pp. 2569–2578.

*Primary Examiner*—Tu B. Hoang
*Attorney, Agent, or Firm*—John C. Hammar

[57] ABSTRACT

We form welded reinforced composites by heating a susceptor along the bond line with a time-varying magnetic field produced with a moving induction coil. To obtain more uniform heating across the susceptor when welding composite parts using induction heating, edge regions of lower absolute impedance or a lower longitudinal impedance than the transverse impedance counterbalance the higher current density and current that occurs near the edges. The susceptor has lower impedance at the edges by altering the aspect ratio (length/width) of openings in the susceptor, by folding the susceptor over onto itself, or both. Uniform heating is important to obtaining a uniform, consistent weld on which aerospace designers can rely.

9 Claims, 5 Drawing Sheets

U.S. PATENT DOCUMENTS

| | | |
|---|---|---|
| 4,180,717 | 12/1979 | Lenk et al. . |
| 4,288,673 | 9/1981 | Ishibashi . |
| 4,296,295 | 10/1981 | Kiuchi . |
| 4,304,975 | 12/1981 | Lenk et al. . |
| 4,313,777 | 2/1982 | Buckley et al. . |
| 4,343,982 | 8/1982 | Schwartz et al. . |
| 4,355,222 | 10/1982 | Geithman et al. . |
| 4,382,113 | 5/1983 | Schwartz et al. . |
| 4,416,713 | 11/1983 | Brooks . |
| 4,421,588 | 12/1983 | Davies . |
| 4,445,951 | 5/1984 | Lind et al. . |
| 4,521,659 | 6/1985 | Buckley et al. . |
| 4,541,891 | 9/1985 | Leatherman . |
| 4,642,155 | 2/1987 | Ramsey . |
| 4,653,396 | 3/1987 | Wennerberg . |
| 4,671,470 | 6/1987 | Jonas . |
| 4,673,450 | 6/1987 | Burke . |
| 4,684,417 | 8/1987 | Grandclement . |
| 4,768,433 | 9/1988 | Boissevain . |
| 4,791,260 | 12/1988 | Waldman . |
| 4,822,972 | 4/1989 | Sugioka et al. . |
| 4,871,412 | 10/1989 | Felix et al. ............... 156/273.9 |
| 4,897,518 | 1/1990 | Mucha et al. . |
| 4,904,972 | 2/1990 | Mori et al. . |
| 4,919,759 | 4/1990 | Ilmarinen et al. . |
| 4,947,464 | 8/1990 | Mori et al. . |
| 4,978,825 | 12/1990 | Schmidt et al. . |
| 5,001,319 | 3/1991 | Holmstrom . |
| 5,047,605 | 9/1991 | Ogden . |
| 5,074,019 | 12/1991 | Link . |
| 5,079,817 | 1/1992 | Anstotz et al. . |
| 5,101,086 | 3/1992 | Dion et al. . |
| 5,199,791 | 4/1993 | Kasanami et al. . |
| 5,225,025 | 7/1993 | Lambing et al. ............... 156/358 |
| 5,240,542 | 8/1993 | Miller et al. . |
| 5,248,864 | 9/1993 | Kodokian . |
| 5,250,776 | 10/1993 | Pfaffmann . |
| 5,283,409 | 2/1994 | Brendel et al. . |
| 5,313,034 | 5/1994 | Grimm et al. ............... 219/765 |
| 5,313,037 | 5/1994 | Hansen et al. . |
| 5,338,611 | 8/1994 | Lause et al. ............... 428/412 |
| 5,340,428 | 8/1994 | Kodokian . |
| 5,481,091 | 1/1996 | Grimm et al. ............... 219/633 |
| 5,486,684 | 1/1996 | Peterson et al. ............... 219/633 |

200 WATTS
5 SECONDS
RATIO 1:1

FIG. 4B

200 WATTS
5 SECONDS
RATIO 2.4:1

FIG. 4C

200 WATTS
5 SECONDS
RATIO 2.8:1

300 WATTS
5 SECONDS
NO SELVAGE

FIG. 8B

300 WATTS
5 SECONDS
1/8 IN. SELVAGE
ON LEFT

FIG. 8C

30 WATTS
5 SECONDS
1/4 IN. SELVAGE
ON LEFT

REINFORCED COMPOSITES FORMED USING INDUCTION THERMOPLASTIC WELDING

REFERENCE TO RELATED APPLICATIONS

This application is a continuation application based upon U.S. patent application Ser. No.08/286,360, filed Aug. 5, 1994, now U.S. Pat. No. 5,500,511 which is a continuation-in-part application based upon U.S. patent application Ser. No. 08/068,520, filed May 27, 1993, now abandoned, which is a continuation-in-part application based upon U.S. patent application Ser. No. 07/777,889, filed Oct. 18, 1991, now abandoned. These applications are incorporated by reference.

TECHNICAL FIELD

The present invention relates to induction welding of multiple plies of thermoplastic materials to form a thermoplastic fusion bond using a thin, perforated, metal susceptor embedded in an adhesive (also called, a resin) placed between the plies of the assembly. An induction coil induces eddy currents in the susceptor to heat the susceptor, adhesive, and resin in the prefabricated composite parts to create the weld. The heating is usually sufficient to melt the resin of the prefabricated resin composite parts that are bonded together so that the adhesive and matrix resin mix to form the weld bond.

BACKGROUND ART

Three major joining technologies exist for aerospace composite structure: mechanical fastening; adhesive bonding; and welding (also called, fusion bonding). Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding requires complicated surface pretreatments.

In contrast, thermoplastic welding features the ability to join thermoplastic composite components at high speeds with minimum touch labor and little, if any, pretreatments. In our experience, the welding interlayer, called a susceptor, also can simultaneously take the place of shims required in mechanical fastening. As such, composite welding holds promise to be an affordable joining process. For "welding" thermoplastic and thermoset composite parts together, the susceptor functions as a hot melt adhesive. If fully realized, the thermoplastic-thermoset bonding will further reduce the cost of composite assembly.

There is a large stake in developing a successful induction welding process. Its advantages versus traditional composite joining methods are:

- reduced parts count versus fasteners
- minimal surface preparation, in most cases a simple solvent wipe to remove surface contaminants
- indefinite shelf life at room temperature
- short process cycle time, typically measured in minutes
- enhanced joint performance, especially hot/wet and fatigue
- permits rapid field repair of composites or other structures Because magnetic field strength decreases exponentially as the fields propagate, the plies of a graphite or carbon fiber reinforced resin matrix composite structure closest to an induction coil will always be substantially hotter than the remote plies at the center of the structure, when relying upon heating through induced currents in the fibers. The fibers however, are relatively poor conductors so fields of high strength are required to achieve any significant heating. If such fields are used, then the fibers closest the induction coil (i.e., magnetic field source) heat most, and actually must overheat to obtain adequate heating at the bond line. To avoid overheating of the outer plies and to insure adequate heating of the inner plies, we use a susceptor having significantly higher conductivity than the fibers. The susceptor has a mesh pattern to allow the adhesive to bond between the prefabricated elements of the composite assembly through the susceptor. The susceptor selectively peaks the heating at the bond line.

Eddy currents that the magnetic field induces in the susceptor, however, produce a higher current density at the edges of the susceptor than in the center, which itself can produce damaging overheating at the edges of the assembly or, at the opposite extreme, underheating the center when the power is controlled to avoid edge overheating.

In our thermoplastic welding process, we apply an electromagnetic induction coil to one side of the assembly to heat the susceptor through the induced eddy currents and to melt the thermoplastic material so than when it resolidifies the elements bond together. To achieve uniform heating, the susceptor design must be tailored to control the current density the induction coil induces. The heating we achieve is directly proportional to the power which the susceptor dissipates. That power is given by the common electromagnetic equation for power loss in a resistor:

$$P = (J^2)(R)$$

wherein P is the power density, J is the eddy current density, and R is the resistance or impedance through which current flows. Therefore, to counter higher current density at the edges (i.e., a higher "J"), we tailor the susceptor near the edges to lower the resistance there relative to the center so that the product (i.e. the power and the heat) remains relatively constant across the width of the susceptor.

Prior art thermoplastic welding processes are illustrated in U.S. Pat. Nos. 3,996,402 and 4,120,712. In these processes, the susceptors have a regular pattern of openings so the resistance near the edges is identical to the resistance in the center. Therefore, these conventional susceptors produce nonuniform heating from center to edge as the current density increases toward the edge.

SUMMARY OF THE INVENTION

Welded reinforced composites are welded together using a moving coil induction heater that induces currents in a susceptor along the bond line to peak heating at the bond line. With adequate heating the susceptor causes resin in the prefabricated reinforced composites to melt, flow, and fuse together to form a thermoplastic weld.

A tailored susceptor controls the current density from center to edge with complimentary control of the impedance to provide even heating of the composite assembly, thereby producing a thermoplastic weld of adequate strength and integrity for aerospace applications.

By changing the aspect ratio (L/D) of openings in the susceptor, we achieve a large difference in the longitudinal and transverse conductivities in the susceptor. For example, a susceptor having openings with a length (L) to width (D) ratio of 2:1 has longitudinal conductivity (i.e., the inverse of resistance or impedance) four times higher than the transverse conductivity. This conductivity difference influences the eddy currents to run longitudinally or to turn from transverse to longitudinal because of the reduced resistance. When we use an anisotropic, diamond shaped opening such as that formed by expanding a sheet of slit foil, a ratio of the length (L) to the width (D) greater than 1 provides a superior weld than using the traditional expanded material having a L/ D ratio of one (i.e., the ratio for circular openings). Our susceptor has a constant line width between openings of about 7 mils (0.18 mm) in a copper foil approximately 3–10 mils (0.075–0.25 mm) thick.

In addition to tailoring the shape of the openings, we can also alter the current density in the susceptor by increasing the foil density along the edge of the susceptor to increase the conductivity of the foil along the edge. That is we fold the foil or compress it transversely near the edge to provide a higher density of metal or simply more metal near the edge than in the center. Folding provides double thickness. Compressing provides more metal per unit width. (It also increases the aspect ratio of the openings in the susceptor by reducing the width of these openings.)

The tailored susceptor is used along a bond line between two prefabricated resin matrix composite parts in a process where an induction coil moves over the seam at a specific rate to provide uniform heating in the bondline which produces a properly cured thermoplastic weld for the composite assembly.

To simplify assembly of the preform prior to welding, we embed the susceptor within the resin. In this way, only three pieces need to be preassembled and arranged. Furthermore, by embedding the susceptor in the adhesive, the openings of the susceptor are already filled and less air is trapped in the preform. The intimate contract of the resin and susceptor means that it will melt more quickly because it is closer to the heating element.

DETAILED DESCRIPTION

Figure 1:
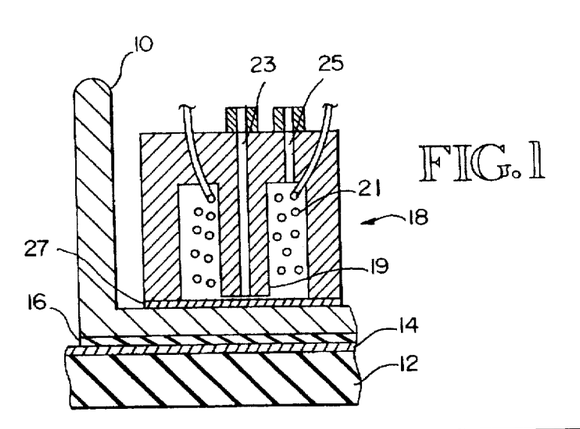
FIG. 1 is a cross-sectional view of a typical thermoplastic welding process of the present invention.

Our thermoplastic welding process is especially useful in bonding reinforced graphite parts currently used in the production of modern aircraft. The use of composite structures in aircraft has allowed the construction of lighter structures with strengths equal to or greater than traditional metal structures. The use of thermoplastic welding on composite components allows the elimination of mechanical fasteners along seams. FIG. 1 shows an L shaped member 10 of graphite fiber reinforced thermoplastic composite material above a similar panel member 12. A susceptor 14 and a layer of thermoplastic resin 16 are positioned to define a bond line. An induction coil 18 moves along the assembly at a specified rate and excites or induces eddy currents in the susceptor 14 to heat the assembly under the coil to the temperature required to melt and cure the resin. The susceptor heats up because of the flow of the eddy currents through it. Our preferred induction coil 18 is made using a powdered iron-ferrite cup-shaped core 19 wound with a Litz wire coil 21, as described in U.S. Pat. No. 5,313,037, which we incorporate by reference. The coil is excited by a power source having a frequency of approximately 50 kHz. The power required is a function of the thickness of the plies in the prefabricated composites and the nature of the materials. We circulate a cooling fluid through the core 19 by means of conduits 23 and 25 to cool the coil 18. The coolant flows into the center leg of the core 15 through conduit 23 and exits through conduit 25. A sole plate 27 the bottom of the core cavity. The core and coil design results in a magnetic field having a central null when the coil is energized. By moving the coil along the bond line at a predetermined rate, we can achieve uniform heating with our tailored susceptor necessary to reliably produce uniform, consistent welds.

The susceptor 14 generally is a copper foil having a thickness of from 0.003 to 0.010 inches (0.075–0.25 mm). We usually embed the susceptor 14 in a thermoplastic resin 16. The susceptor/resin tape is usually about 0.010 in (0.25 mm) thick. If separate metal susceptors and resin sheets are used, the resin film without the embedded susceptor is also about 0.010 in (0.25 mm) thick. Any material having good electrical conductivity may be used, but we prefer copper, nickel, or nickel-coated copper. The foil is slit by laser cutters and pulled at its edges to create expanded diamond shaped openings segmented by lines of approximately uniform thickness of 7 mils (0.18 mm). This process requires a thicker foil, however, usually about 0.020 in (0.50 mm) thick. The foil openings can be made using other conventional methods such as chemical etching or mechanical stamping. While we prefer to use diamond shaped openings because they are easy to form with expansion or etching, the openings can be any shape with the caveat that controlling the amount of metal in the lines between openings and, consequently, the performance of the susceptor, is troublesome when the lines are of varied width.

Figure 5A:
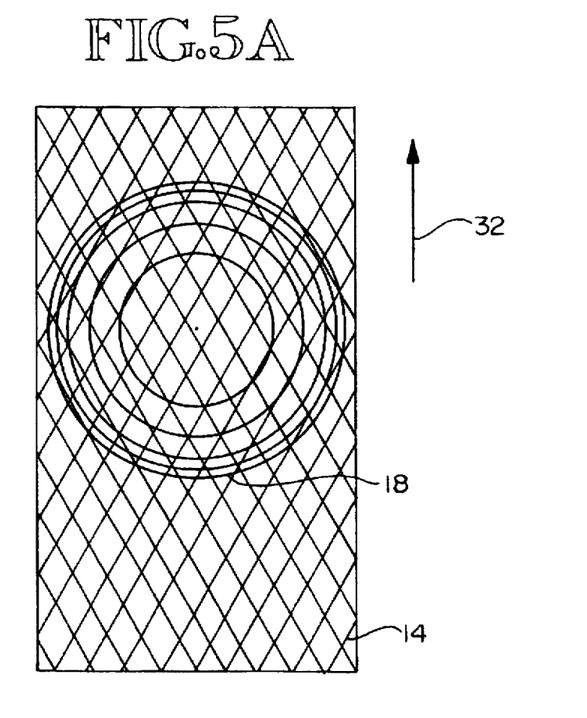
FIG. 5a is a plan view of a susceptor showing the relative location of the induction coil during welding.

The induction coil induces currents in a nonlinear distribution across the width of the susceptor. As shown in FIG. 5a, the coil 18 generally is aligned directly over the susceptor in the welding process moving longitudinally in the direction indicted by arrow 32. Current in the coil induces eddy currents in the susceptor in direct proportion to the oscillating magnetic field strength. The coil design creates a null at the center because no current flows there in the coil and the current (and associated field) increases toward the edge of the coil. (We are only concerned with the absolute value.) Therefore, the induced currents in the susceptor are nonlinear and the resulting heating would be nonuniform unless the susceptor were tailored to adjust its impedance counter to the change in the current and current density that the coil induces.

Figure 5B:
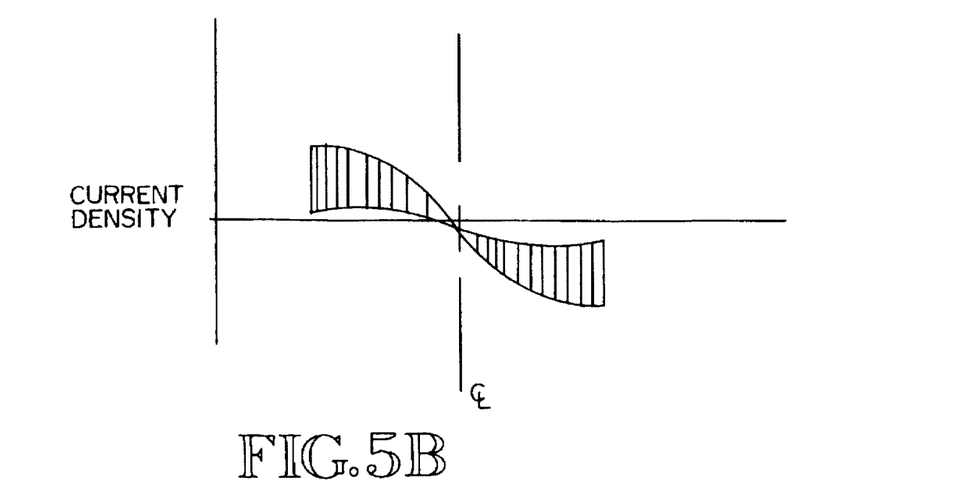
FIG. 5b illustrates the current density in relation to the centerline of the susceptor for a thermoplastic welding process using the induction coil of U.S. Pat. No. 5,313,037.

Again, the power (P) is a function of the current (J) and the resistance (i.e. impedance) (R): $P=(J^2)(R)$. So, if the eddy current doubles, to maintain P constant, the impedance must decrease to one-fourth its initial value. FIG. 5b schematically illustrates the current density (wherein positive or negative reflects, in effect, the direction of the current flow). To maintain the power constant, then, the impedance must be much lower at the edges than it is in the center of the susceptor.

We modify the edges of the susceptor to adjust the current density so that the current density can be higher and thereby produce a proportionately higher eddy current without producing a higher temperature. While the current is higher the impedance is lower on the edges (there is more metal to carry the current), and the net effect (i.e., $(J^2)(R)$) will be substantially uniform heating.

Now, the edge treatment would produce lower temperatures at the edges than in the center if the magnetic field strength were constant across the susceptor. With our coil, however, the field strength is, highest at the edges. Therefore, the two elements (coil and susceptor) work together to yield a relatively uniform temperature in the bond line.

We have discovered several ways to control the impedance to achieve more uniform heating than conventional susceptors provide. First, we adjust the aspect ratio of diamond-shape openings in the susceptor (i.e. the ratio of the length to the width of the openings; L/D) to create a longitudinal impedance lower than the transverse impedance. Second, we fold the susceptor near the edges to produce thin strips of double thickness where the additional mass and surface area of the susceptor in these edge strips reduces the current density, which is a complimentary measure of the impedance. Third, we compress or crimp openings in regions near the edge to alter the aspect ratio and to increase the ratio of the longitudinal conductivity relative to the transverse conductivity.

In the center of the susceptor, the current that we induce with the coil has many paths in which it can flow. Near the edge, however, the choices decrease, in essence, unless we create additional current paths artificially. The coil is trying to induce a current of the largest magnitude near the edges. Therefore, we introduce, in one embodiment of the present invention, a susceptor with nonlinear impedance to counterbalance the current and to achieve relatively uniform heating.

The ratio of the length (L) to the width (D) of the openings is critical to achieving uniform heating in a foil of uniform thickness having openings of only one size and shape and uniform line widths. For the foil shown in FIG. 2 or 3, the ratio of length to width (L/D) is 2.

Figure 2:
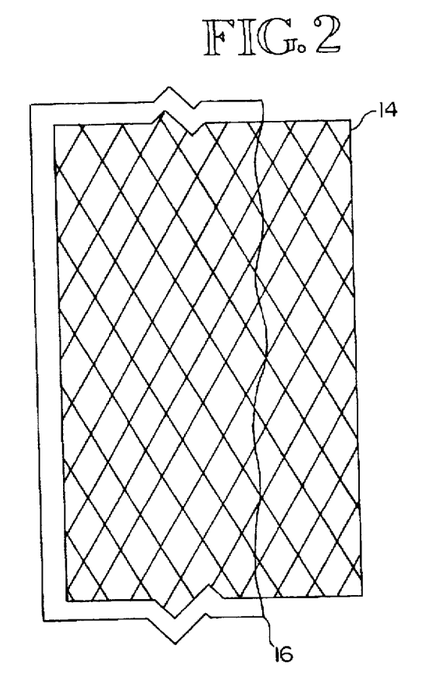
FIG. 2 is an enlarged view of a preferred susceptor of the present invention embedded in a thermoplastic resin.
Figure 3:
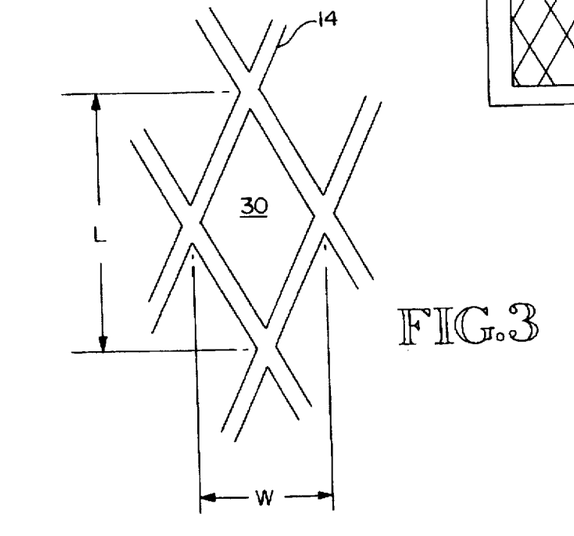
FIG. 3 is a detail of one opening 30 in the susceptor of FIG. 2.
Figure 4A:
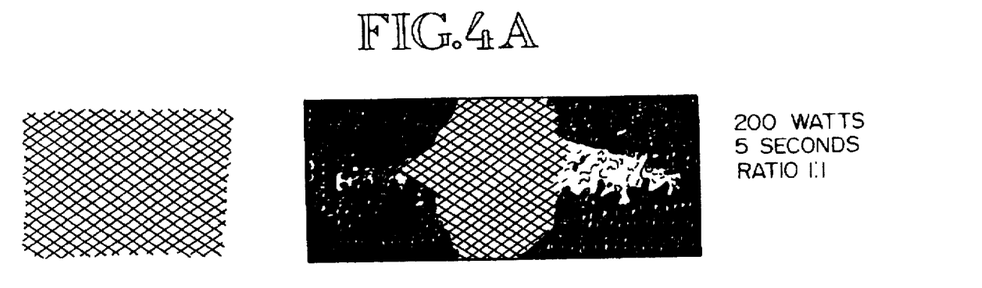
FIGS. 4a, 4b, and 4c are thermograms of three different susceptors.
Figure 4B:
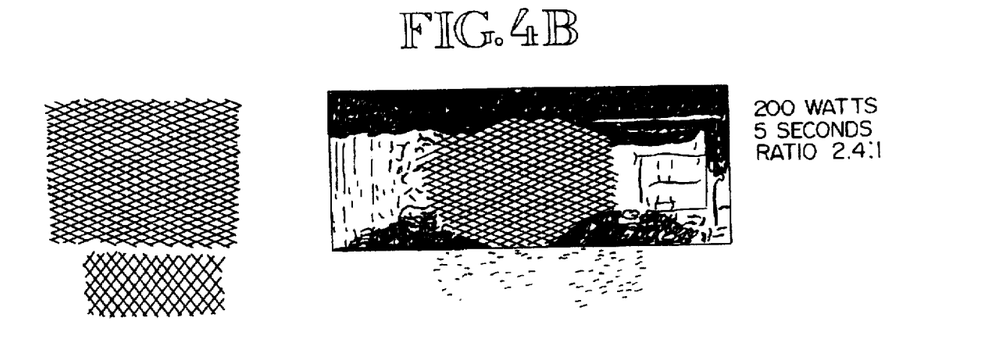
Figure 4C:
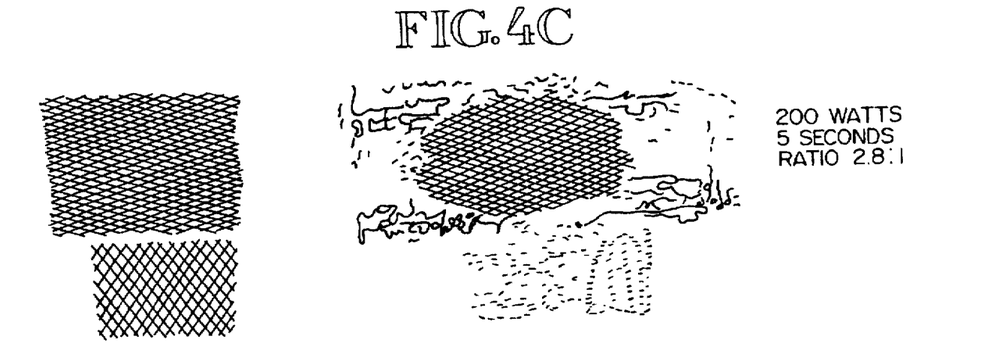

With a susceptor having a uniform distribution of openings of aspect ratio greater than one (as shown in FIGS. 2 and 3), crowding of the current along the edge of the susceptor is reduced and the temperature is more uniform even though the absolute impedance at the edges and in the center is equal. FIGS. 4a, 4b, and 4c demonstrate this effect. The higher aspect ratio provides an impedance for the susceptor which dominates the power equation so the effect of eddy current changes is masked. In each of these thermograms, we applied 200 Watts of power for 5 seconds with the induction coil. The darker areas of the thermograms indicate higher temperatures. In FIG. 4a, the openings in the susceptor foil had a L/D ratio of 1:1. With this susceptor, the temperature was substantially higher at the edges than in the center. In FIG. 4b, the ratio of L/D in the susceptor was 2.4:1. Here the nonuniform heating along the edge of the susceptor was less than that shown for the susceptor in FIG. 4a. In FIG. 4c, the L/D ratio was 2.8:1, and the heating was the most uniform.

The longitudinal conductivity is higher than the transverse conductivity principally because the path length for the current to flow longitudinally is more direct and consequently shorter than that required for transverse flow.

Figure 6:
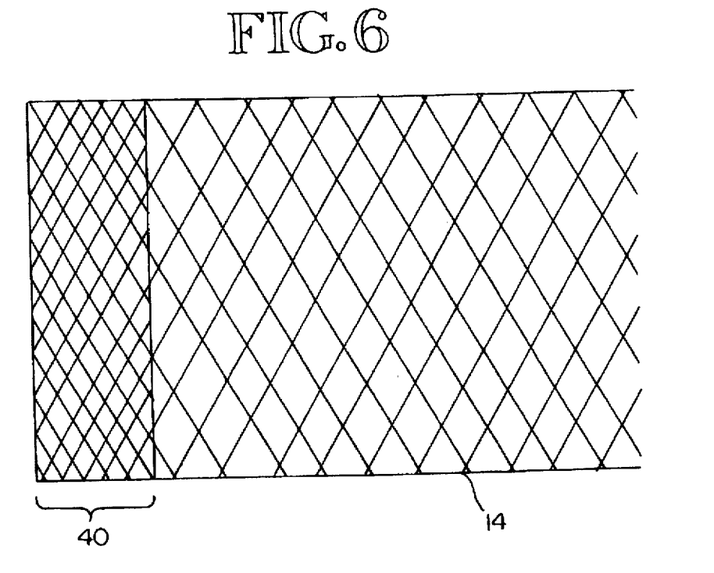
FIG. 6 is a view of the susceptor folded at the edge to increase foil density.
Figure 7:
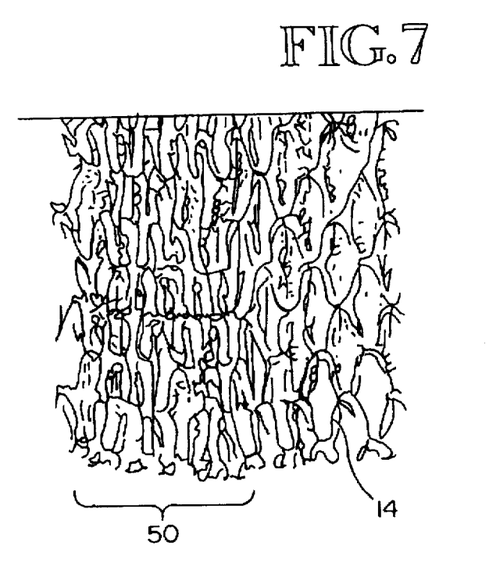
FIG. 7 is a view of the foil susceptor with a compressed edge to increase foil density.
Figure 8A:
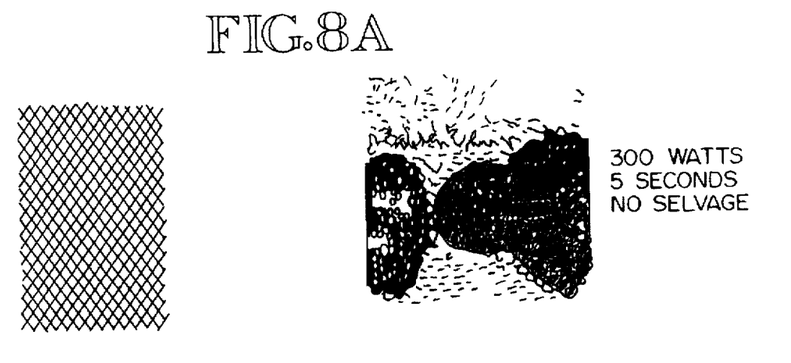
FIGS. 8a, 8b and 8c is a series of thermograms showing the effect of edge tailoring of the susceptor.
Figure 8B:
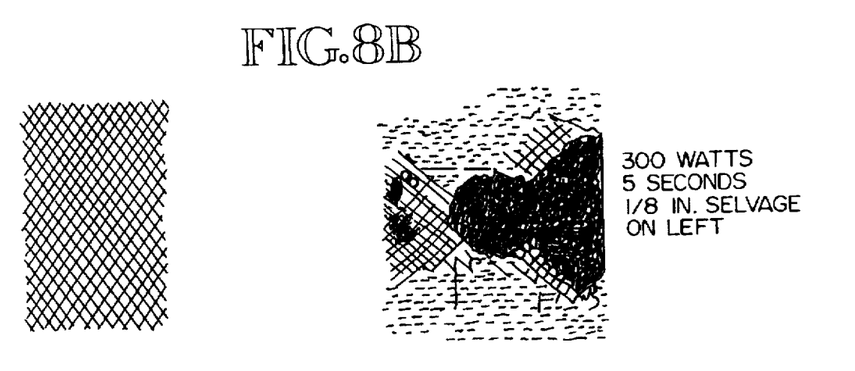
Figure 8C:
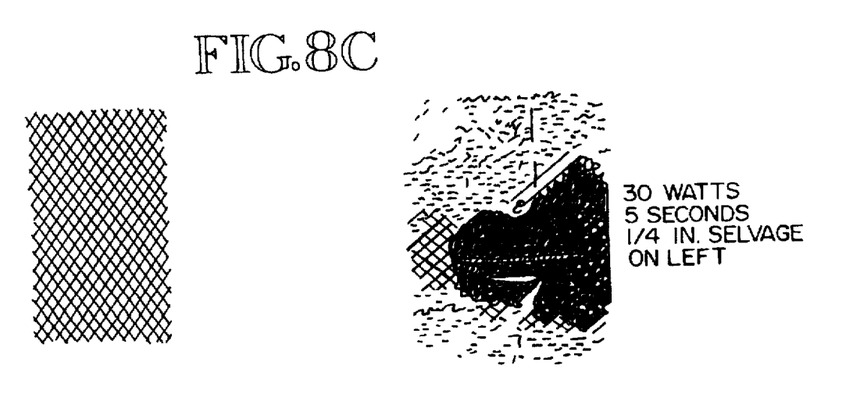

In FIG. 6, the susceptor 14 is folded over on itself near the left edge to form a double thick region 40 at the edge. Of course, double thickness could simply be manufactured into the susceptor. In FIG. 7, the susceptor 14 has been compressed slightly inwardly along its edges to from a region 50 where the aspect ratio (L/D) is higher than in the center portion and the density of metal ($gm/cm^3$) is increased over the center portion. Both factors reduce the current densities in region 50 so heating at the edges is reduced. Again, the combined effect with the higher field strength results in a more uniform temperature in the bond line. The thermographs of FIGS. 8a, 8b, and 8c illustrate the effect of tailoring the edge of the susceptor. In each test, we applied 300 Watts of power for 5 seconds. In all cases the susceptor had a square diamond shape pattern with an aspect ratio of 1:1. In FIG. 8a, the susceptor had no change at its edge, and higher heating at the edge of the susceptor is obvious. In the susceptor of FIG. 8b, we formed a folded edge about ⅛ inch (3 mm) wide by folding the susceptor over on itself. The edge overheating on this sample (i.e., the absence of black in the thermograph) was substantially reduced. In FIG. 8c we folded the left edge ¼ inch (6 mm) of the susceptor over on itself. In this example, edge heating was further reduced. We also have achieved a reduction in edge heating by compressing a portion of the susceptor edge to form a susceptor like that illustrated in FIG. 7.

The edge techniques can be combined to achieve the desired tailoring. Instead of compressing the susceptor to form the edge region 50, we can form the susceptor with a grading in the openings (i.e. higher aspect ratios toward the edge) such as square diamonds in the center and elongated diamonds in the edge region. The grading can be in distinct steps or can be gradual across the width.

Our goal is to produce aircraft structure that eliminates fasteners. Welded structure will be far less expensive because welding will eliminate the labor to drill holes accurately and to inspect the fasteners after installation. We also will avoid other problems that fasteners introduce, such as sealing around the fastener and the holes, mismatch of materials, and lighting arcing from the fasteners. To replace the fasteners, however, requires confidence that the welds are uniform and consistent, because a failure at any weak point in the weld could lead to catastrophic unzipping of the entire welded structure. The present invention, then, focuses upon one of the most important problems, temperature uniformity along the bond line to achieve uniform and complete melt and cure of the adhesive. A typical application would be welding a wingskin to the underlying spars.

As mentioned earlier, we embed the susceptor in the resin to simplify the welding process. Making a susceptor/resin tape of the type shown in FIG. 2 eliminates the steps of applying separate layers of resin between the respective elements in a composite-susceptor-composite assembly. It also ensures that there will always be adequate resin proximate the susceptor and essentially uniform resin thickness across the welding bond line. Our typical tape is about 2 inches wide with KIII Avamid polyimide resin (available from du Pont), although we can use PEEK, PEKK, PES, or any other thermoplastic. The resin must be compatible with the matrix resin in the composite and generally the resin is the same resin as the matrix resin. While the prefabricated composites usually are thermoplastics, we are also experimenting with thermoplastic resins. We generally add sacrificial plies in the area of the bond line and profile match the prefabricated parts by machining these sacrificial plies.

The composites we join with thermoplastic welding are typically the same materials and are prefabricated before the welding. Typically, the composite is a carbon or graphite fiber reinforced KIII Avamid polyimide that has a melt temperature of 310° C. (620° F.). It is resin rich in the region of the bond line. We complimentary profile the surfaces of the composite pars to ensure a weld free from voids. We assemble the composite parts with the resin/susceptor tape lying along the bond line, and complete the welding by moving the induction coil from one end to the other at about 2-4 inches (5-10 cm) per minute. We can use multiple passes to improve the weld, according to the method of Walker and Peterson.

This invention permits control of the heating of thermoplastic welding process by tailoring the susceptor shape and edge density according to the needs of the particular assembly we weld.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and are not intended to limit it. Accordingly, limit the claims only as necessary in view of the pertinent prior art.

We claim:

1. A welded reinforced composite, comprising:
   (a) a plurality of fiber reinforced composite parts arranged to define a bond line;
   (b) a susceptor disposed between the parts at the bond line for receiving induced currents from an induction heater to peak heating at the bond line, wherein the susceptor has higher electrical conductivity than fibers in the parts; and
   (c) a thermoplastic fusion bond at the bond line embedding the susceptor and joining the parts.

2. The welded reinforced composite of claim 1 wherein the fibers are carbon or graphite.

3. The welded reinforced composite of claim 2 wherein the composite is a polyimide resin.

4. The composite of claim 1 wherein the susceptor is metal.

5. An assembly for welding composite parts, comprising:
   (a) a plurality of fiber reinforced composite parts arranged to define a bond line;
   (b) a susceptor disposed between the parts at the bond line for receiving induced currents from an induction heater during a thermoplastic welding operation to peak heating at the bond line, wherein the susceptor has higher electrical conductivity than fibers in the parts.

6. The assembly of claim 5 further comprising thermoplastic resin encasing the susceptor.

7. A method for creating a thermoplastic fusion bond at a bond line between a plurality of fiber reinforced composite parts, comprising the steps of:
   (a) assembling a plurality of fiber reinforced composite parts to define a bond line between the parts where the parts will be joined with a thermoplastic fusion bond;
   (b) disposing a susceptor along the bond line to peak heating at the bond line, the susceptor being susceptible to induction heating and having a higher electrical conductivity than fibers in the parts; and
   (c) inducing currents in the susceptor to melt resin at the bond line in the parts and to form a thermoplastic fusion bond between the parts at the bond line.

8. The method of claim 7 further comprising the step of:
   tailoring the susceptor to achieve a substantially uniform temperature along the bond line when melting the resin to form the fusion bond.

9. The method of claim 7 wherein the susceptor is a metal mesh encased in thermoplastic resin and wherein the composite have a resin matrix of the same material as the thermoplastic resin.

* * * * *